(12) United States Patent
Scott et al.

(10) Patent No.: US 7,098,961 B2
(45) Date of Patent: Aug. 29, 2006

(54) HORIZONTAL SYNC PULSE DETECTION FOR VIDEO SIGNAL DECODING

(75) Inventors: Havard L. Scott, San Diego, CA (US); Peter M. Murdock, San Diego, CA (US); Lior Levin, La Jolla, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 447 days.

(21) Appl. No.: 10/746,921

(22) Filed: Dec. 23, 2003

(65) Prior Publication Data

US 2005/0134732 A1 Jun. 23, 2005

(51) Int. Cl.
*H04N 5/10* (2006.01)
*H04N 5/08* (2006.01)

(52) U.S. Cl. ........................ 348/531; 348/540; 348/465

(58) Field of Classification Search ................ 348/531, 348/540, 541, 500, 465, 525, 464; H04N 5/08, H04N 5/10
See application file for complete search history.

(56) References Cited

U.S. PATENT DOCUMENTS 6,909,467 B1* 6/2005 Kuzumoto et al. ......... 348/465
2004/0095510 A1* 5/2004 Suzuki et al. ............... 348/465

* cited by examiner

*Primary Examiner*—Sherrie Hsia
(74) *Attorney, Agent, or Firm*—Farjami & Farjami LLP

(57) ABSTRACT

Methods and systems are described for determining a slice level used for detecting an edge of a horizontal sync pulse of a horizontal line of a video signal, where the horizontal line has a plurality of samples. An exemplary method comprises low-pass filtering the video signal to generate a plurality of filtered samples; determining a first level, wherein a predetermined number of the plurality of filtered samples have levels above the first level; determining a second level, wherein the second level is a minimum level of levels for the plurality of filtered samples; and determining the slice level by adding the first level and the second level to generate a summed level, and dividing the summed level by two to determine the slice level.

27 Claims, 3 Drawing Sheets

HORIZONTAL SYNC PULSE DETECTION FOR VIDEO SIGNAL DECODING

BACKGROUND OF THE INVENTION

1. Field of the Invention

The present invention relates generally to video signal decoders and, more specifically, to methods and systems for detecting horizontal sync pulses in video signals.

2. Related Art

Generally, video pictures or video signals are made up of video content signals, horizontal sync pulses and vertical sync pulses. Typically, a video picture includes a number of video frames. For example, according to the NTSC (National Television System Committee) format, there are 30 frames per second, and according to the PAL (Phase Alternation by Line) format, there are 25 frames per second. At the end of each frame, a vertical sync pulse is transmitted which indicates to a recipient electronic device that the frame has come to an end. The duration of the vertical sync pulse depends upon the time the electronic devices take to receive the next frame. The amplitude of the vertical sync pulse is approximately 0.3 volts, which when added to the video content signal gives a total amplitude of approximately 1.0 volt peak to peak.

Further, each video frame is made up of lines. In NTSC, there are 525 lines per frame, whereas, in PAL, there are 625 lines per frame. Each point in the line reflects the intensity of the video signal. At the end of each line, a horizontal sync pulse is transmitted which indicates to the recipient electronic device that the line has come to an end, so that the electronic device gets ready for the next line. The amplitude of the horizontal sync pulse is approximately 0.3 volts.

The screens of most monitors of electronic devices are drawn in a series of lines, left to right and top to bottom. When the monitor finishes drawing one line and reaches its right-most excursion, the beam is turned off while the monitor returns the beam to the left side of the screen. A similar process occurs when the last line on the screen is finished drawing, in which event, the beam traverses to the top left corner of the screen.

In a video picture, the beam is moved to the left of the screen and to the top of the screen in accordance with and based on the detection of the synchronization signals. In other words, when the vertical sync pulse is detected the beam moves to the top left corner of the screen to begin drawing the next frame, and when the horizontal sync pulse is detected, the beam moves to the left of side of the screen to begin drawing the next line. Accordingly, it is quite important to properly detect the sync pulses.

FIG. 1 illustrates video signal line 100, which includes horizontal front porch 110, horizontal sync pulse 120, horizontal back porch 130, color burst 132 and horizontal active pixels 150. As shown, video signal line 100 begins at the falling edge of horizontal sync pulse 120 and ends at the falling edge of the next horizontal sync pulse. Horizontal front porch 110 is the period of time between the previous horizontal active pixels (not shown) and the beginning of horizontal sync pulse 120. Horizontal sync pulse 120 is a change in voltage of the video signal, which triggers the electronic device to stop the rightward progress of drawing the beam and begin drawing on the left side of the screen. Thus, each line begins with the start of the horizontal sync pulse and ends with the start of the next horizontal sync pulse. Horizontal back porch 130 is the period of time between the end of horizontal sync pulse 120 and the beginning of horizontal active pixels 150. According to NTSC and PAL formats, horizontal back porch 130 also includes color burst 132, as a color calibration reference.

The falling and rising edges of horizontal sync pulse 120 are typically defined at 50% of the height of horizontal sync pulse 120 amplitude, which may also be referred to as the "slice level." In other words, the falling edge of horizontal sync pulse 120 is detected when the video signal level moves below the slice level, and the rising edge of horizontal sync pulse 120 is detected when the video signal level move above the slice level. Conventionally, video decoders determine the slice level, which is used to synchronize their displays to horizontal sync pulse 120, by relying upon the amplitude of various portions of the video signal, as defined by the video standards, or by relying upon the relative amplitude of horizontal sync pulse 120 height to the peak of horizontal active pixels 150. These conventional approaches suffer from many drawbacks.

For example, because some video sources do not adhere to video standards with respect to the amplitude of the pulses, either absolutely or relative to the video content, conventional video decoders, which rely upon the absolute amplitude of the pulses or relative amplitude of the pulses, are not able to determine the slice level properly and, thus, fail to detect horizontal sync pulse 120. For instance, one conventional approach relies upon the relative amplitude for the peak, in the active or video content region, which is about 1.2v and the minimum level at zero volt to determine the slice level; however, some non-compliant video sources have the minimum level at 0.2 volts, which causes the slice level to be calculated improperly. Therefore, conventional video decoders experience problems locking to the video signals originating from such video sources, and require constant adjustment to key parameters every time a new video source is discovered that violates the standard video format in its own special way.

Accordingly, there is an intense need in the art for decoding methods and systems that can detect horizontal sync pulse 120 even if a video source is not in compliance with the standard video format, in terms of amplitude of the pluses, either absolutely or relative to the video signals.

SUMMARY OF THE INVENTION

In accordance with the purpose of the present invention as broadly described herein, there is provided a variety of exemplary embodiments for determining a slice level used for detecting an edge of a horizontal sync pulse of a horizontal line of a video signal, where the horizontal line has a plurality of samples. An exemplary method comprises low-pass filtering the video signal to generate a plurality of filtered samples; determining a first level, wherein a predetermined number of the plurality of filtered samples have levels above the first level; determining a second level, wherein the second level is a minimum level of levels for the plurality of filtered samples; and determining the slice level based on the first level and the second level.

In a further aspect, determining the slice level comprises adding the first level and the second level to generate a summed level; and dividing the summed level by two to determine the slice level. In one aspect, the predetermined number is 88% of the plurality of samples. In yet another aspect, the plurality of samples are approximately 1,825 samples and the predetermined number is approximately 1,600. Further, in one aspect, the first level is a back porch level of the horizontal line and the second level is a sync level of the horizontal line.

In yet another aspect, determining the first level includes: initializing the first level with an arbitrary level; comparing a sample level of each the plurality of samples with the first level; incrementing a counter for each sample level greater than the first level; subtracting the pre-determined number from the counter after receiving the plurality of samples for the horizontal line; and adjusting the first level based on the subtracting. In a further aspect, adjusting includes: increasing the first level if the subtracting generates a positive result; decreasing the first level if the subtracting generates a negative result; and maintaining the first level if the subtracting generates a zero result.

According to other aspects, systems, devices and computer software products or media for determining the slice level for detecting edges of the horizontal sync pulses in accordance with the above techniques are provided.

These and other aspects of the present invention will become apparent with further reference to the drawings and specification, which follow. It is intended that all such additional systems, methods, features and advantages be included within this description, be within the scope of the present invention, and be protected by the accompanying claims.

BRIEF DESCRIPTION OF DRAWINGS

The features and advantages of the present invention will become more readily apparent to those ordinarily skilled in the art after reviewing the following detailed description and accompanying drawings, wherein.

DESCRIPTION OF EXEMPLARY EMBODIMENTS

The present invention may be described herein in terms of functional block components and various processing steps. It should be appreciated that such functional blocks may be realized by any number of hardware components and/or software components configured to perform the specified functions. For example, the present invention may employ various integrated circuit components, e.g., memory elements, digital signal processing elements, filters, comparators, counters, adders, gain controls, logic elements, and the like, which may carry out a variety of functions under the control of one or more microprocessors or other control devices. Further, it should be noted that the present invention may employ any number of conventional techniques for data transmission, signaling, signal processing and conditioning, sampling, filtering, and the like. Such general techniques that may be known to those skilled in the art are not described in detail herein.

It should be appreciated that the particular implementations shown and described herein are merely exemplary and are not intended to limit the scope of the present invention in any way. Indeed, for the sake of brevity, conventional analog and digital circuits, circuit components, filters, integrators, comparators, counters, data transmission, signal processing and other functional aspects of the data communication system (and components of the individual operating components of the system) may not be described in detail herein. Furthermore, the connecting lines shown in the various figures contained herein are intended to represent exemplary functional relationships and/or physical couplings between the various elements. It should be noted that many alternative or additional functional relationships or physical connections might be present in a practical communication system.

Figure 1:
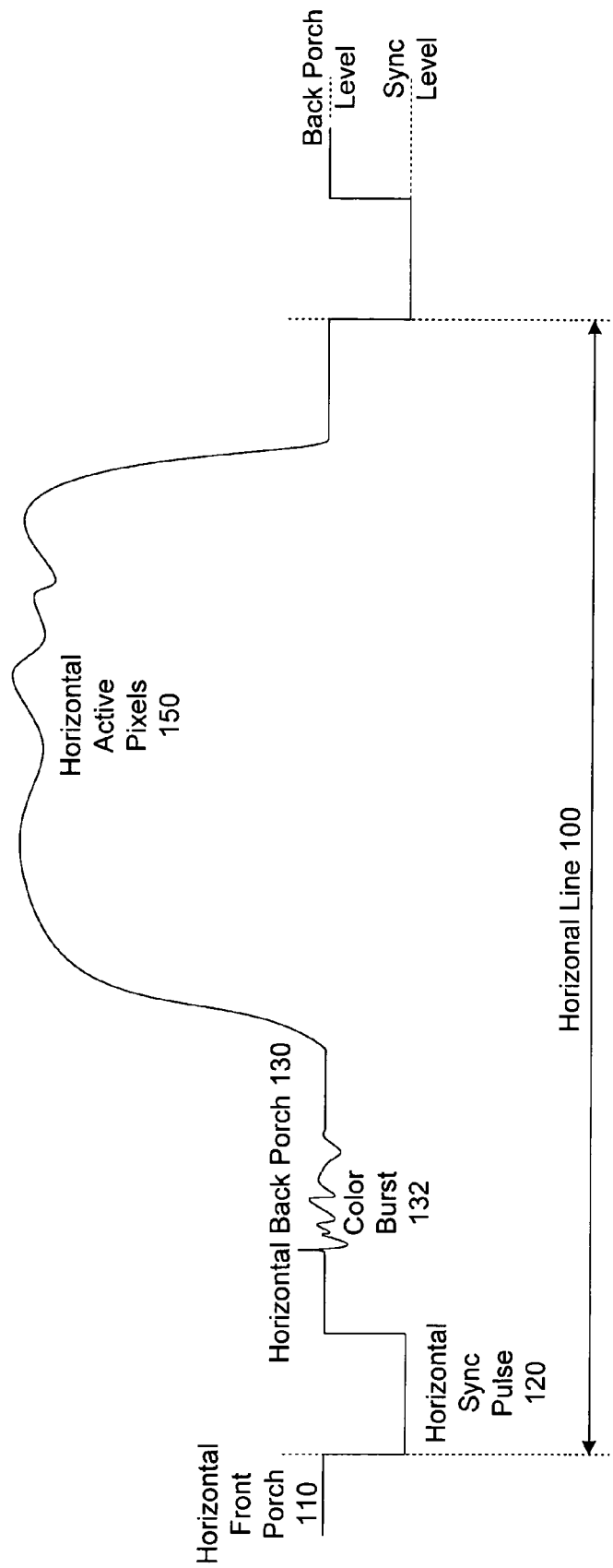
FIG. 1 illustrates a typical video signal line, including horizontal front porch, horizontal sync pulse, horizontal back porch, color burst and horizontal active pixels.
Figure 2:
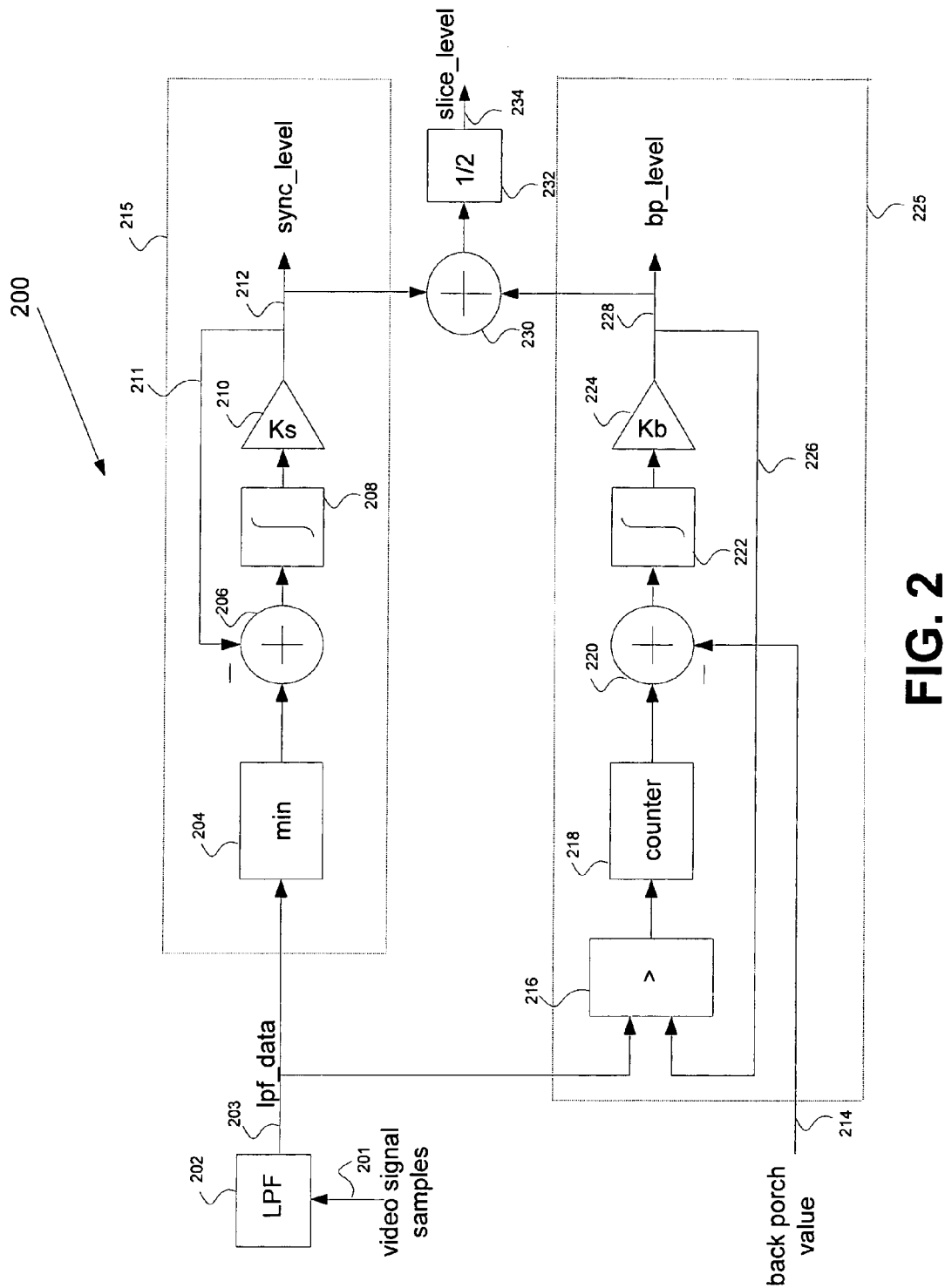
FIG. 2 illustrates a block diagram of a sync pulse detection system, according to one embodiment of the present invention, for determining the slice level to detect the horizontal sync pulse of FIG. 1.

FIG. 2 illustrates a block diagram of sync pulse detection system 200, according to one embodiment of the present invention, for determining the slice level to detect the horizontal sync pulse of FIG. 1. As discussed above, a primary purpose of sync pulse detection system 200 is to determine the slice level, where the falling edge of horizontal sync pulse 120 is detected when the video signal level moves below the slice level, and the rising edge of horizontal sync pulse 120 is detected when the video signal level move above the slice level. As shown, video signal samples 201 enters low pass filter ("LPF") 202 operating at a cut-off frequency, such as 500 KHz, which is designed to remove much of the noise in video signal samples 201, as well as color burst 132 from horizontal back porch 130 of video signal samples 201.

In one embodiment, LPF 202 has a slow roll-off, which is designed to minimize ringing of the sync edges. For example, LPF 262 includes five LPF stages with the following coefficients: F1: [8, 0, 0, 0, 18, 0, 0, 0, 33, 0, 0, 0, 44, 0, 0, 0, 50, 0, 0, 0, 44, . . . ]; F2: [1, 4, 6, 4, 1]; F3: [1, 0, 2, 0, 1]; F4: [1, 2, 1]; and F5: [1, 0, 1]. Alternatively, all five filters may be convolved into a single filter of length 45. The delay can be used to qualify the sync edges found on the non-filtered data more precisely, when the sync is detected (by the signal dropping below the slice level) on the filtered data.

The output of LPF 200 is lpf_data 203, which is fed into back porch level detection block 225 and sync level detection block 215, which generate back porch level 228 and sync level 212, respectively, as discussed below. As shown, slice level 234 is determined by adding sync level 212 and back porch level 228, and by dividing the sum in half to generate the slice level, which is then used for detecting the edges of horizontal sync pulse 120.

The present invention relies upon the timing relationship of horizontal sync pulse 120 in the video signal or horizontal line 100 to determine the slicing level. According to the video format standards, horizontal sync pulse 120 is about 12% of horizontal line 100, as shown in FIG. 1. Further, each horizontal line 100 provides about 1,825 samples, which is the average number of samples for NTSC (1,820 samples per line) and PAL (1,830 samples per line. Accordingly, about 12% of the samples or about 225 samples should be of a level falling at sync level 212 and 88% of the samples or about 1,600 samples should be of a level falling above back porch level 228.

Based on the above timing relationship between horizontal sync pulse 120 and horizontal line 100, back porch level detection block 225 of the present invention is designed to determine back porch level 228 by comparing the level of incoming samples or lpf_data 203 to a programmable arbitrary level stored in integrator 222. For example, in one embodiment, integrator level 226 may be initialized at an arbitrary level, e.g. zero. As shown, comparator 216 receives lpf_data 203 and integrator level 226. For each level of sample in lpf_data 203 that is above integrator level 226, comparator 216 causes the value of counter 218, which is initialized at zero, to count up. Once 1,825 samples have been received by back porch level detection block 225, back porch value 214, e.g. 1,600, is subtracted from the value of counter 218 using adder 220. If the subtraction result is positive, i.e. more than 1,600 samples have levels above integrator level 226, adder 220 generates a positive error and integrator 222 increases integrator level 226; or else, if the subtraction result is negative, i.e. less than 1,600 samples have levels below integrator level 226, adder 220 generates a negative error and integrator 222 decreases integrator level 226; until integrator level 226 finds a level at which 1,600 of samples have levels that are above integrator level 226, which defines back porch level 228.

As shown, back porch level detection block 225 includes gain 224, which receives the output of integrator 222. Gain 224 includes two gain settings, one for acquisition and one for tracking. The acquisition gain is four times higher than the tracking gain to improve lock time. The tracking gain is lower to provide robust behavior in the presence of copyright-protected, e.g., Macrovision, encoded signals.

On the other hand, sync level detection block 215 detects sync level 212 by finding the minimum level in 1,825 samples in min level 204, which is then fed to a sync control loop, including adder 206, integrator 208 and gain 210, which are similar to adder 220, integrator 222 and gain 224, respectively. As shown, integrator level 211 is fed back to adder 206, where the sync control loop tracks sync level 212. Once 1,825 samples have been received by sync level detection block 215, integrator value 211 is subtracted from min level 204 by adder 206. If the subtraction result is positive, i.e. min level 204 is more than integrator level 211, adder 206 generates a positive error and integrator 208 increases integrator level 211; or else, if the subtraction result is negative, i.e. min level 204 is below integrator level 211, adder 206 generates a negative error and integrator 208 decreases integrator level 211; until integrator level 211 finds a level equal to min level 204, which defines sync level 212.

Once sync level detection block 215 and back porch level detection block 225 determine sync level 212 and back porch level 228, respectively, adder 230 adds sync level 212 and back porch level 228 to generate the height of horizontal sync pulse 120. Next, divider 232 divides the height of horizontal sync pulse 120 by two (50% level), which provides slice level 234 for detection of the falling and rising edges of sync pulses.

In one embodiment, an optional gate may be provided to ignore the vertical interval for updating back porch level 228. In such embodiment, back porch level 228 tracks sync level 212 during vertical blanking, so that no updates take place during this period, which provides extra immunity to copyright-protected encoded signals.

Figure 3:
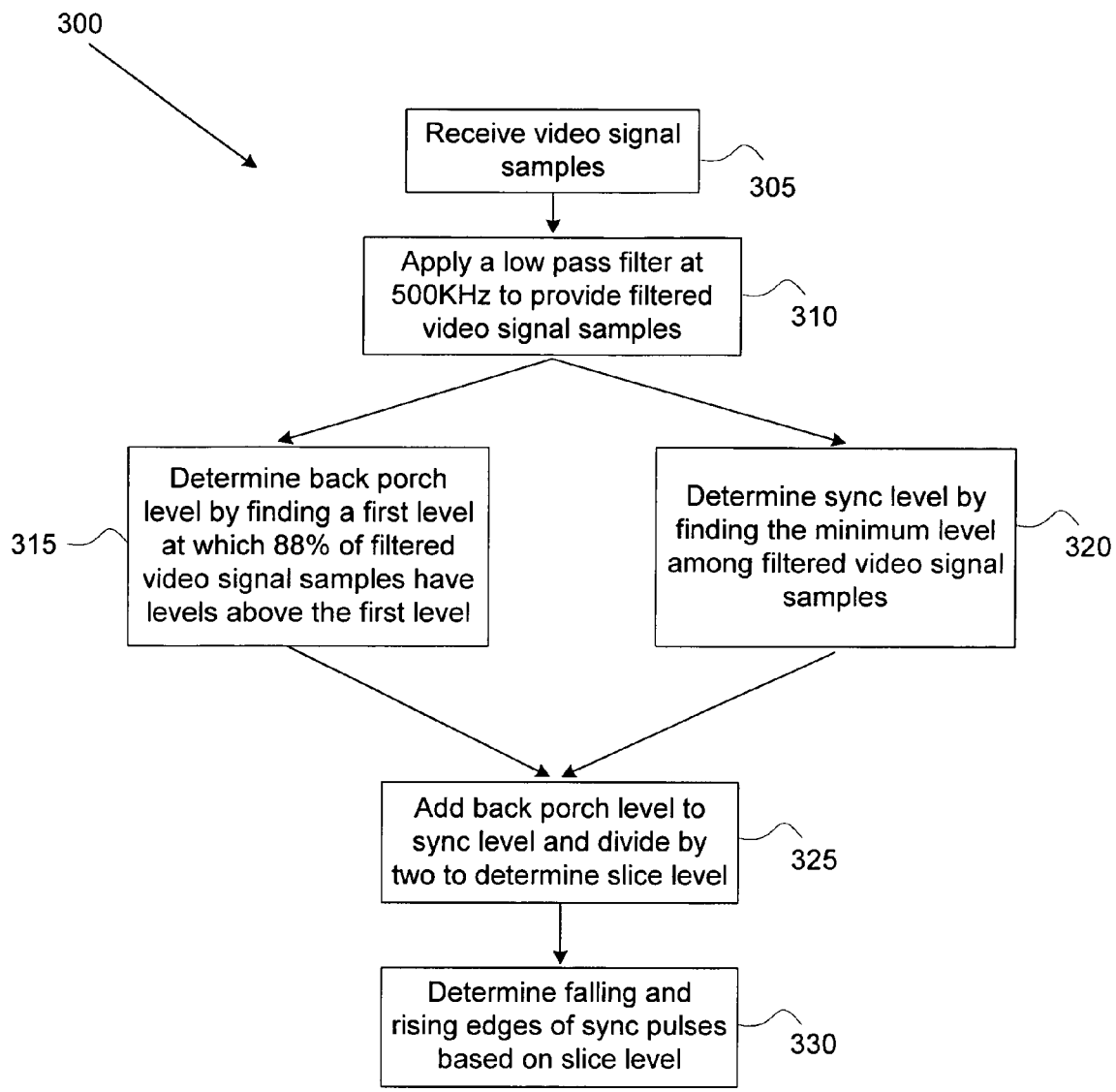
FIG. 3 illustrates a flow diagram of a sync pulse detection method, according to one embodiment of the present invention, for detecting the horizontal sync pulse of FIG. 1.

FIG. 3 illustrates a flow diagram of sync pulse detection method 300, according to one embodiment of the present invention, for detecting horizontal sync pulse 120. Sync pulse detection method 300 of FIG. 3 begins by receiving video signal samples at step 305. At step 310, a low pass filter is applied to video signal samples received at step 305. In one embodiment, the low pass filter operates at 500 KHz, which removes much of the noise in video signal samples, as well as color burst 132 in horizontal back porch 130. Next, at step 315, back porch level is determined by finding a first level at which 88% of the filtered video signal samples (e.g. 1,600 samples out of 1,825 samples) have levels above the first level. In one embodiment, the first level is set arbitrarily, and then increased or decreased while a number of horizontal lines are processed, until the first level reaches the 88% goal, at which time back porch level is set to the first level. Furthermore, at step 320, the minimum level of the filtered video signal samples is determined, and then the sync level is set to the minimum level.

At step 325, the sync level and the back porch level are added and divided by two to obtain the slice level. Next, at step 330, the slice level is utilized to determine the falling and rising edges of sync pulses.

The methods and systems presented above may reside in software, hardware, and/or firmware on the device, which can be implemented on a microprocessor, digital signal processor, application specific IC, or field programmable gate array ("FPGA"), or any combination thereof, without departing from the spirit of the invention. Furthermore, the present invention may be embodied in other specific forms without departing from its spirit or essential characteristics. The described embodiments are to be considered in all respects only as illustrative and not restrictive.

What is claimed is:

1. A method of determining a slice level used for detecting an edge of a horizontal sync pulse of a horizontal line of a video signal, said horizontal line having a plurality of samples, said method comprising:
    low-pass filtering said video signal to generate a plurality of filtered samples;
    determining a first level, wherein a predetermined number of said plurality of filtered samples have levels above the first level;
    determining a second level, wherein said second level is a minimum level of levels for said plurality of filtered samples; and
    determining said slice level based on said first level and said second level.

2. The method of claim 1, wherein said determining said slice level comprises:
    adding said first level and said second level to generate a summed level; and
    dividing said summed level by two to determine said slice level.

3. The method of claim 1, wherein said predetermined number is 88% of said plurality of samples.

4. The method of claim 1, wherein said plurality of samples are approximately 1,825 samples.

5. The method of claim 4, wherein said predetermined number is approximately 1,600.

6. The method of claim 1, wherein said first level is a back porch level of said horizontal line.

7. The method of claim 1, wherein said second level is a sync level of said horizontal line.

8. The method of claim 1, wherein said determining said first level includes:
    initializing said first level with an arbitrary level;
    comparing a sample level of each said plurality of samples with said first level;
    incrementing a counter for each sample level greater than said first level;
    subtracting said pre-determined number from said counter after receiving said plurality of samples for said horizontal line; and
    adjusting said first level based on said subtracting.

9. The method of claim 8, wherein said adjusting includes:
    increasing said first level if said subtracting generates a positive result;
    decreasing said first level if said subtracting generates a negative result; and
    maintaining said first level if said subtracting generates a zero result.

10. A system for determining a slice level used for detecting an edge of a horizontal sync pulse of a horizontal line of a video signal, said horizontal line having a plurality of samples, said system comprising:
- a low-pass filter configured to filter said video signal to generate a plurality of filtered samples;
- a first level detection block configured to determine a first level, wherein a predetermined number of said plurality of filtered samples have levels above the first level;
- a second level detection block configured to determine a second level, wherein said second level is a minimum level of levels for said plurality of filtered samples; and
- a slice level block configured to determine said slice level based on said first level and said second level.

11. The system of claim 10, wherein said slice level block includes an adder configured to add said first level and said second level to generate a summed level, and a divider configured to divide said summed level by two to determine said slice level.

12. The system of claim 10, wherein said predetermined number is 88% of said plurality of samples.

13. The system of claim 10, wherein said plurality of samples are approximately 1,825 samples.

14. The system of claim 13, wherein said predetermined number is approximately 1,600.

15. The system of claim 10, wherein said first level is a back porch level of said horizontal line.

16. The system of claim 10, wherein said second level is a sync level of said horizontal line.

17. The system of claim 10, wherein said first level detection block includes:
- an integrator initialized to an arbitrary level;
- a comparator configured to compare a sample level of each said plurality of samples with said first level;
- a counter configured to count each sample level greater than said first level; and
- an adder configured to subtract said pre-determined number from said counter after receiving said plurality of samples for said horizontal line;
- wherein said integrator is further configured to adjust said first level based on said subtracting.

18. The system of claim 17, wherein said integrator adjusts said first level by:
- increasing said first level if said subtracting generates a positive result;
- decreasing said first level if said subtracting generates a negative result; and
- maintaining said first level if said subtracting generates a zero result.

19. A system for determining a slice level used for detecting an edge of a horizontal sync pulse of a horizontal line of a video signal, said horizontal line having a plurality of samples, said system comprising:
- means for low-pass filtering said video signal to generate a plurality of filtered samples;
- means for determining a first level, wherein a predetermined number of said plurality of filtered samples have levels above the first level;
- means for determining a second level, wherein said second level is a minimum level of levels for said plurality of filtered samples; and
- means for determining said slice level based on said first level and said second level.

20. The system of claim 19, wherein said means for determining said slice level comprises:
- means for adding said first level and said second level to generate a summed level; and
- means for dividing said summed level by two to determine said slice level.

21. The system of claim 19, wherein said predetermined number is 88% of said plurality of samples.

22. The system of claim 19, wherein said plurality of samples are approximately 1,825 samples.

23. The system of claim 22, wherein said predetermined number is approximately 1,600.

24. The system of claim 19, wherein said first level is a back porch level of said horizontal line.

25. The system of claim 19, wherein said second level is a sync level of said horizontal line.

26. The system of claim 19, wherein said first level is initialized with an arbitrary level, and wherein said means for determining said first level includes:
- means for comparing a sample level of each said plurality of samples with said first level;
- means for incrementing a counter for each sample level greater than said first level;
- means for subtracting said pre-determined number from said counter after receiving said plurality of samples for said horizontal line; and
- means for adjusting said first level based on said subtracting.

27. The system of claim 26, wherein said means for adjusting includes:
- means for increasing said first level if said subtracting generates a positive result;
- means for decreasing said first level if said subtracting generates a negative result; and
- means for maintaining said first level if said subtracting generates a zero result.

* * * * *